United States Patent
Price, III et al.

(10) Patent No.: US 6,748,903 B1
(45) Date of Patent: Jun. 15, 2004

(54) FILAMENTED ANIMAL COLLAR AND METHOD OF MANUFACTURE

(76) Inventors: William Clinton Price, III, 6808 Arbor Oaks Cir., Bradenton, FL (US) 34209; Lauren Edenfield Price, 6808 Arbor Oaks Cir., Bradenton, FL (US) 34209

( * ) Notice: Subject to any disclaimer, the term of this patent is extended or adjusted under 35 U.S.C. 154(b) by 0 days.

(21) Appl. No.: 10/440,939

(22) Filed: May 19, 2003

(51) Int. Cl.⁷ .............................................. A01K 27/00
(52) U.S. Cl. ....................... 119/858; 119/863; D30/152
(58) Field of Search ................. 119/856, 857, 119/858, 654, 863, 865, 792; 54/19.3, 19.1; D30/152, 151; 63/1.11, 3.1, 3.2, 3, 9, 37, 38; 2/338, 339, 311–319, 321, 322

(56) References Cited

U.S. PATENT DOCUMENTS

| | | | | |
|---|---|---|---|---|
| 1,324,043 A | * | 12/1919 | Greene | 2/339 |
| 2,766,459 A | * | 10/1956 | Stiglin | 2/339 |
| 3,213,830 A | * | 10/1965 | Wiesemann | 119/654 |
| D206,525 S | | 12/1966 | Klimkiewicz | |
| 3,765,376 A | * | 10/1973 | Higgins | 119/858 |
| 4,126,902 A | * | 11/1978 | McKenna | 2/338 |
| 4,321,891 A | | 3/1982 | Moeller | |
| 4,407,233 A | | 10/1983 | Bozzacco | |
| 4,719,876 A | | 1/1988 | Wilken | |
| 4,993,215 A | * | 2/1991 | Schutte | 54/19.3 |
| 5,174,097 A | * | 12/1992 | Muratore | 54/6.1 |
| 5,322,037 A | | 6/1994 | Tozawa | |
| 5,865,148 A | | 2/1999 | Aguirre | |
| 6,070,434 A | | 6/2000 | Traver | |
| 6,256,793 B1 | | 7/2001 | Arias | |
| 6,308,663 B1 | * | 10/2001 | Philen et al. | 119/864 |
| 6,519,778 B2 | | 2/2003 | Arias | |
| 6,675,611 B2 | | 1/2004 | Hunter | |

* cited by examiner

Primary Examiner—Charles T. Jordan
Assistant Examiner—T. Nguyen
(74) Attorney, Agent, or Firm—Dorothy S. Morse

(57) ABSTRACT

Animal collars, and a method for their manufacture, wherein a strong decorative and substantially filamented structure that supports a sequence of adorning items is incorporated as a functioning part of the collar structure. The present invention collar has a filamented center portion and non-filamented end members configured for adjustable fastening of the collar around the neck of a pet. A looped connection on each end of the filamented portion is formed through the use of a decorative fastener and contemplated for attachment of the filamented portion to the end members. Also, the sturdy construction of the filamented portion provides the needed strength for use under stress during pet ambulation without the risk of loss for highly valued adorning items, such as but not limited to antique glass beads, crystals, pearls, faceted objects, metallic objects, and precious and semi-precious stones.

18 Claims, 3 Drawing Sheets

FILAMENTED ANIMAL COLLAR AND METHOD OF MANUFACTURE

CROSS-REFERENCE TO RELATED APPLICATIONS

None

BACKGROUND-FIELD OF THE INVENTION

This invention relates to animal collars, particularly to a strong, decorative, and substantially filamented animal collar having a jewelry quality sequence of adorning items incorporated as a functional part of the collar structure, and a method for its manufacture, that can be used by an animal handler to fulfill the basic pet collar functions of being able to exercise control over a domestic animal while it is being ambulated via the use of a leash or other tether and providing a means of being able to affix to the domestic animal law mandated disease inoculation records as well as personalized identity information, and which in addition to these basic functions also provides a means of adorning the domestic animal with a selection of attractive jewelry quality filament-supported decorations, including precious and semi-precious stones, according to the stylishness and preference of the animal owner/handler. Due to the sturdiness and strength of its construction, there is minimal risk of filament breakage or unfastening and loss of the valuable stones and other adorning items, and little risk of the animal wearing the collar swallowing any of the valuable stones, crystals, pearls, antique beads, and/or other filament supported decorations. Existing multi-purpose collars fail to simultaneously fulfill the basic pet collar functions mentioned above, while also adorning a domestic animal with attractive, durable, jewelry quality, and secure filament-supported decorations.

BACKGROUND-DESCRIPTION OF RELATED ART

Historically, domestic pets have been useful members of human society, loved and honored companions, and symbols of status for individuals and organizations alike. People continue to incorporate pets into modern society, however, for a variety of important reasons modern pet owners are required to exercise responsibilities to society in the course of their pet ownership and thereby have an obligation to provide certain tools during the exercise of such responsibilities. One such pet ownership tool is the pet collar. A pet collar should have a sturdy construction to enable an owner/handler to exercise control over his or her pet in public and when otherwise needed. It also should provide a means for affixing a variety of informational devices thereto, such as pet identification tags and government-required inoculation badges. Further, for those who love pets and treat them as honored companions, and according to the stylishness and preference of the animal owner/handler, pet collars can be also made to function as decorative embellishments and adorning devices. However, prior to use of the present invention, high-quality decorations, including but not limited to precious and semi-precious stones, antique beads, pearls, and crystals, were seldom used as adorning items or embellishments for pets since the flexible lengths of fabric, fiber, and/or rubber materials used to support them had a limited useful lives and limited strength that caused such materials to be at risk for breakage under the stress of use, and which as a result placed all adorning items and embellishments of appreciable value supported by such materials at a risk for loss while at the same time presented a safety hazard to animals wearing them who might attempt to swallow loose adorning items after breakage. In contrast, the present invention has a more sturdy construction than prior art collars attempting to incorporate an aligned sequence of adorning items into their structure and allows a pet owner/handler to decorate his or her pet with high quality decorative objects that provide visible evidence of the status and value of the pet, and/or provide decoration that communicates the stylishness and preferences of the owner/handler.

While the following inventions represent prior art for the present invention and may provide one or more of the functions described hereinabove, none alone or in combination teaches all of the features and advantages of the present invention. The invention disclosed in U.S. Pat. No. 5,322,037 to Tozawa (1994) is a cat collar that uses a slip-prohibiting friction clasp that allows for disengagement of the clasp members when a predetermined resistance is reached. Thus, the Tozawa clasp allows the collar to become unleashed and sets the animal free in the event that the collar gets caught on a foreign object or the animal is involved in a struggle. While the Tozawa clasp would prevent breakage of its collar under stress and would thereby prevent any adorning items thereon from becoming lost or swallowed by the cat wearing it, the Tozawa invention does not teach the jewelry-like and strong filamented support of a sequence of adorned items as a part of the functioning collar structure that is fundamental to the present invention. Similarly, the invention disclosed in U.S. Pat. No. D206,525 to Klimkiewicz (1966) is dog collar with bib ornamentation. Although ornamentation is involved, the Klimkiewicz invention does not teach the jewelry-like and strong filamented support of adorned items found in the present invention. Further, the invention disclosed in U.S. Pat. No. 4,321,891 to Moeller (1982) is an adjustable animal collar that uses a buckle and spaced-apart holes to adjust the collar to various sizes to accommodate different sized animals. Although the present invention also has a buckle and spaced-apart holes, it is the strong filamented support of a sequence of adorning items that distinguishes the present invention from the Moeller invention and other existing inventions. In addition, the invention disclosed in U.S. Pat. No. 4,407,233 to Bozzazzo (1983) discloses a safety collar for pets that can include the attachment of reflective forms and shapes. The Bozzazzo collar incorporates attachments transversely extending from the length direction of the collar, with the attachments optionally comprising elements of highly reflective material on individual hook-like members suspended about the collar to signal oncoming traffic as to the presence of the animal during situations involving reduced visibility. However, the means of attachment of adorning items in the Bozzacco invention does not teach the structure, means of attachment, or manner of use for the adorning items in the present invention In addition, the invention disclosed in U.S. Pat. No. 4,719,876 to Wilken (1988) is a restraint collar which uses a pliable and thickened elongated pad for the area between the base of the shoulders and the animal's neck with hook-and-pile type of fastening means to snugly place the collar around the animal's neck. Although the Wilken invention teaches secure connection of its collar around the neck of a pet so as to prevent the collar from breaking under stress, the Wilken invention does not teach the jewelry-like and strong filamented support of adorning items that is fundamental to the present invention. As a result, no prior art alone or in combination is known that discloses a means of fulfilling all three of the above-identified purposes of a pet collar, that is, to provide a functional collar that is sufficiently strong to enable the pet owner to exercise control over the domestic animal without collar breakage under routinely anticipated conditions, to supply an effective connection means that enables the pet owner to attach leash and other temporary tether devices to the collar as well as permanently affixed items such as identification tags and inoculation badges, and finally to supply a jewelry-like aligned sequence of decorative components including but not limited to precious stones, semi-precious stones, metallic objects, antique beads, pearls, glass beads, crystal beads, other valuable objects adaptable for threaded/stringed attachment, and the like, as well as related identification adornments, as a part of the functioning portion of the pet collar with a filamented construction that has a sufficiently strong composition and assembly to protect expensive decorative components against loss. The present invention provides a way in which to communicate the stylishness and preferences of an animal's owner/handler that is not found in any other known animal collar.

BRIEF SUMMARY OF THE INVENTION- OBJECTS AND ADVANTAGES

The primary object of this invention is to provide an animal collar of sufficient strength to enable an animal owner/handler to maintain control over his or her domestic animal in routinely encountered ambulating situations while adorning the animal with a jewelry-like aligned sequence of decorations according to the stylishness and preferences of the owner/handler. It is also an object of this invention to provide an animal collar having a means by which to attach durable identification tags and law mandated badges thereto. It is a further object of this invention to provide a sturdy and permanent means of affixing a sequence of jewels and other highly valued decorations to make the sequence a functioning part of an animal collar and whereby due to the sturdiness of construction the risk of decoration loss due to collar breakage or unfastening is minimized. It is also an object of this invention to provide a method of animal collar construction that allows for a variety of distinctive and unique appearances. It is a further object of this invention to provide an animal collar that is made from materials that are durable and require little or no maintenance between uses.

As described herein, properly manufactured and used, the present invention improves the domestic animal collar in very significant ways. Its filamented construction enables the owner/handler of an animal to have a primary use collar that is durable under routinely anticipated pet use, and in addition it provides an attractive collar enabling the display of a variety of highly valued decorations having distinctive and unique appearances, including but not limited to precious and semi-precious stone components, crystals, pearls, antique beads, vintage beads glass beads, metallic objects, and the like. Each preferred embodiment of the present invention collar comprises a central filamented portion and non-filamented end members connected thereto which are configured for fastening the filamented portion around the neck of a domestic pet. The type, configuration, size, and number of each adorning item used as a part of the functional filamented portion of the present invention collar can vary and include, but is not limited to, assorted sizes and shapes of glass, plastic, gold, other metals, crystal, pearls, antique beads, vintage beads, decorated beads, painted beads, inlaid beads, cloisonne, precious stones, and semi-precious stones. Thus, the variation of appearance is only limited by the stylishness and preference of the owner/handler. The filamented portion is then secured via proximal end loops therein to corresponding loops made in the proximal ends of the non-filamented end members using a decorated fastener, such as a crimping bead. Additional crimping beads and/or other means can optionally be used throughout the filamented portion of the present invention to minimize the number of beads/objects affected should stresses applied to the filament ever cause it to break. The non-filamented end members can be made from materials that include but are not limited to leather, suede, fabric, metal, and plastic. Stitching, with or without bonding agents, is typically used to form the looped proximal ends in the non-filamented end members. The decorated fasteners forming the proximal end loops in the filamented portion can be made a part of the looped ends and placed in an unobtrusive but visible position, or placed entirely out of view within the looped proximal end of one of the non-filamented end members. In the alternative, the decorated fasteners securing the ends of the filamented portion can be featured as a distinctive and visible part of the decorative collar structure. The filament and decorated fastener give the present invention sufficient strength to enable an animal owner/handler to maintain control over his or her domestic animal in routinely encountered ambulating situations. The sturdiness of the filament construction minimizes the risk of collar breakage and decoration loss, as does the incorporation of assembly procedures that reduce the number of beads/objects affected should breakage occur. A D-ring or other connector is provided as a part of one of the non-filamented end members for attachment of a leash or other tether, as well as durable identification tags and law mandated badges. It is also contemplated for the filament construction to be permanent and durable, and for the adorning items to require little or no maintenance other than the occasional removal of surface debris on an as needed basis. Further in the interest of minimizing maintenance, although silver decorations could be used and are considered within the scope of the present invention, other non-tarnishing decorative objects would be preferred for the filamented portion of the present invention unless treated with a long-lasting tarnish resistant coating.

The description herein provides the preferred embodiments of the present invention but should not be construed as limiting the scope of the filamented pet collar invention. For example, variations in the type, number, sequencing, and configuration of the adorning items used as a part of the filamented portion; the length of the filamented portion and the non-filamented end members; the type of decorative fastener used to secure the ends of the filamented portion; and the number, type, configuration, and positioning of leash/tag/badge connection means used, other than those shown and described herein, may be incorporated into the present invention. Thus the scope of the present invention should be determined by the appended claims and their legal equivalents, rather than being limited to the examples given.

BRIEF DESCRIPTION OF THE SEVERAL VIEWS OF THE DRAWING

FIG. 1b is an enlarged top view of the left half of first preferred embodiment shown in FIG. 1a.

FIG. 1c is an enlarged top view of the right half of first preferred embodiment shown in FIG. 1a.

FIG. 2b is an enlarged top view of the left half of second preferred embodiment shown in FIG. 2a.

FIG. 2c is an enlarged top view of the right half of second preferred embodiment shown in FIG. 2a.

FIG. 3a is a top view of a third preferred embodiment of the present invention having more than one filamented portion, a non-filamented member connected to each end of the filamented portion, tether attachment means secured to one of the non-filamented members, and decorated fastening means for joining the distal ends of the non-filamented members together around the neck of a pet, with the crimping beads being hidden from view within the looped ends of the non-filamented members.

FIG. 3b is an enlarged top view of the left half of third preferred embodiment shown in FIG. 3a.

FIG. 3c is an enlarged top view of the right half of third preferred embodiment shown in FIG. 3a.

DETAILED DESCRIPTION OF THE INVENTION

Figure 1A:
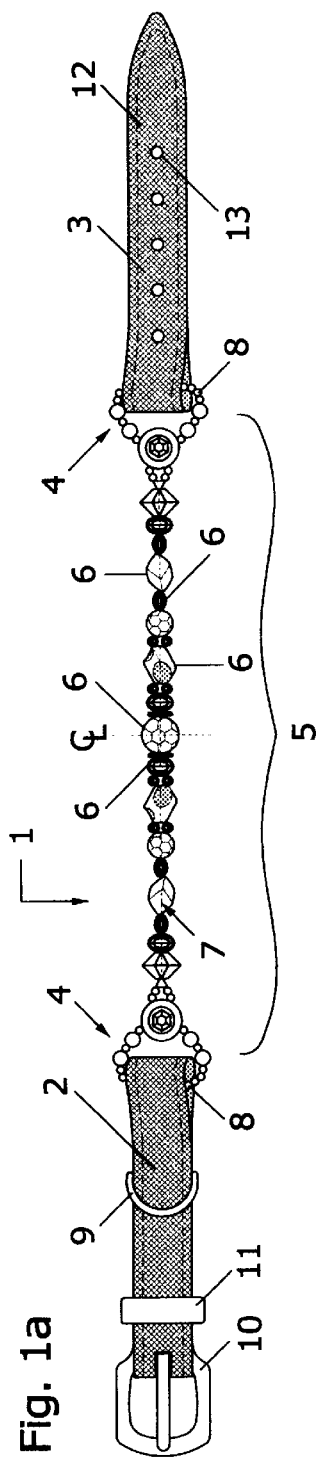
FIG. 1a is a top view of a first preferred embodiment of the present invention having a central filamented portion, a non-filamented member connected to each end of the filamented portion, tether attachment means secured to one of the non-filamented members, fastening means for joining the distal ends of the non-filamented members together around the neck of a pet, and a crimping bead positioned within each end loop of the filamented portion to secure it for sturdy connection to the non-filamented members so that the first preferred embodiment can be used by an animal owner/handler to exercise control over the pet wearing it while the pet is being ambulated via a tether or leash.
Figure 1B:
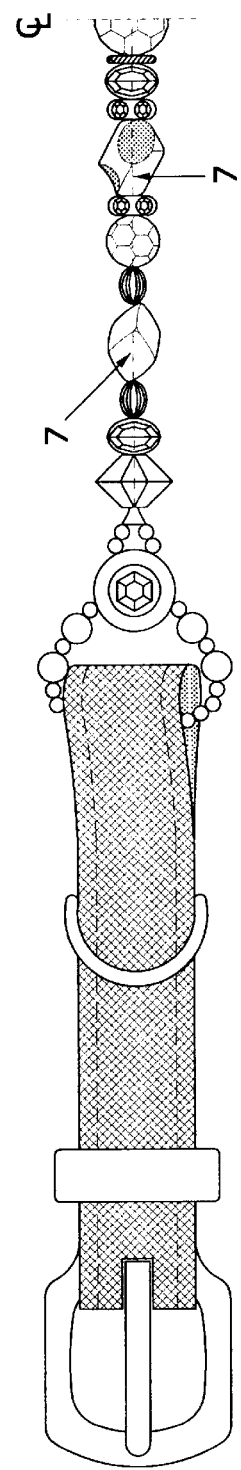
Figure 1C:
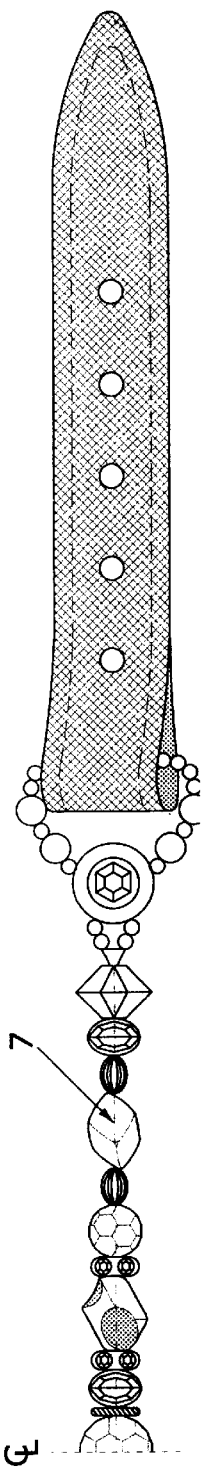
Figure 2A:
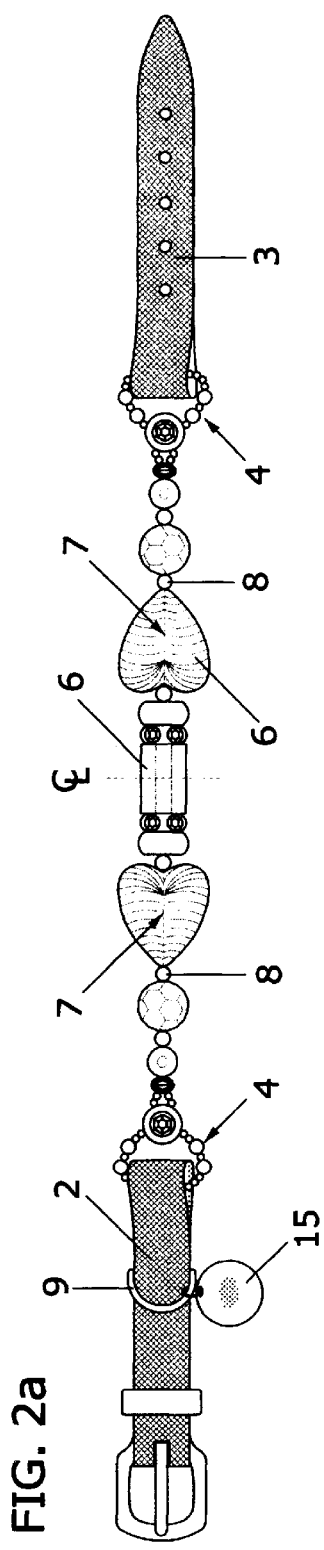
FIG. 2a is a top view of a second preferred embodiment of the present invention having a central filamented portion, a non-filamented member connected to each end of the filamented portion, tether and identification tag attachment means secured to one of the non-filamented members, fastening means for joining the distal ends of the non-filamented members together around the neck of a pet, and a crimping bead positioned apart from the end loop of the filamented portion.

FIGS. 1a, 1b, and 1c show a first preferred embodiment 1 of the present invention animal collar having a central filamented portion 5, a first non-filamented member 2 having a buckle 10 on its distal end, and a second non-filamented member 3 having a tapering distal configuration with several holes 13 therethrough that are dimensioned for ready engagement with the tongue of buckle 10. The number of holes 13 used is not critical and can be more or less than the number shown. Also, the tapering configuration of the distal end of second non-filamented member 3 is not critical, but preferred for ease of engagement with buckle 10. FIGS. 1a–1c further show longitudinal stitching 12 on the perimeter edges of first non-filamented member 2 and second non-filamented member 3, which is used to form the proximal ends each thereof into a looped configuration. The gauge of stitching 12 is merely representative, and can be different from that shown. In addition, FIGS. 1a and 1b show a narrow sleeve 11 proximally located relative to buckle 10 on first non-filamented member 2 that is configured and positioned for securing the portion of the distal end of second non-filamented member 3 which extends beyond buckle 10 after engagement of first non-filamented member 2 to second non-filamented member 3 when first preferred embodiment 1 is formed into a loop. Narrow sleeve 11 is preferably fixed in position relative to first non-filamented member 2 and can be secured to first non-filamented member 2 by any conventional means, such as but not limited to rivets, bonding agents, and/or stitching 12. The width and thickness dimensions of sleeve 11 are not critical, however, for weight limitation considerations its size should not increase beyond that for which appropriate functional and/or aesthetic benefit is derived. FIGS. 1a and 1b further show a leash attachment ring 9 connected to first non-filamented member 2. As shown in FIGS. 3a and 3c, leash attachment ring 9 can alternatively be connected to second non-filamented member 3. It is preferred that attachment ring 9 be fixed in position relative to first non-filamented member 2, preferably by stitching 12 and have a D-shaped configuration, or equivalent, that allows first non-filamented member 2 or second non-filamented member 3 to lay substantially flat against the neck of an animal. Although not shown, in addition to use for temporary connection of a tether or leash, attachment ring 9 may be used for connection of objects containing identifying information about the animal wearing it, such as but not limited to inoculation records and/or home address. Further, FIGS. 1a and 1b show leash attachment ring 9 having an arcuate configuration. Neither the configuration, nor the size, of attachment ring 9 shown in FIGS. 1a and 1b is critical. Materials used for first non-filamented member 2 and second non-filamented member 3 should be flexible, durable, and sturdy, and can include but are not limited to leather, fabric, suede, metal, and plastic. Also, the thickness dimension of the materials selected for first non-filamented member 2 and second non-filamented member 3 must be thin enough to be lightweight, and comfortable to the animal when doubled to create the end loops, however it must also be sufficiently substantial in thickness and/or content to avoid breakage from anticipated animal-induced stresses, such as but not limited to the collar becoming caught on something while the animal wearing it struggles to set itself free. Buckle 10, sleeve 11, and attachment ring 9 must all be made from materials that are sufficiently strong to avoid breaking when animal-induced stresses are applied, and preferably corrosion-resistant so as to be durable and aesthetically appealing during extended use. While plastics and/or some fabric may be successfully used for buckle 10, sleeve 11, and attachment ring 9, metal is generally preferred when the present invention collar to be used for an animal having outdoor access. It is also contemplated for buckle 10 to be decorated with design patterns involving color, texture, and/or adorning items, such as but not limited to those shown in FIGS. 3a and 3b by the number 17. Since filamented portion 5 is incorporated as a functioning part of first preferred embodiment 1, it must have a sturdy construction that allows it to maintain its integrity when placed under the type of animal induced stresses expected to occur during routine use. FIGS. 1a–1c show filamented portion 5 having a filament 7 upon which an aligned sequence of beads/objects 6 is supported. For most purposes, although not limited thereto, filament 7 would be a non-corroding metal wire, similar in composition to that used in jewelry/beadwork but more substantial in diameter. Filamented portion 5 also has a connection loop 4 on each of its ends, as well as a branching structure immediately proximal to connection loops 4. In addition, two crimping beads 8 are supported upon filament 7, each positioned as a part of a different one of the connection loops 4. As shown in FIG. 2a, multiple crimping beads 8 can be featured as a part of the artistic design of filamented portion 5, so as to prevent the loss of no more than one or two beads/objects 6 should filament 7 ever break as a result of animal-induced or other applied stress. Further, FIGS. 1a–1c show each half of filamented portion 5 as having a sequence of beads/objects 6 that is a mirror image of the other. While the mirror image type of symmetry has artistic benefit, it is not critical and the bead/objects 6 used on filament 7 could be totally selected at random or according to color considerations, as well as shape. Connection loops 4 are a fundamental portion of first preferred embodiment 1, to assist in achieving the jewelry-like appearance desired for the connection between filamented portion 5 and first non-filamented member 2 and second non-filamented member 3. As shown in FIGS. 1a–1c, connection loops 4 also comprise beads/objects 6 supported upon filament 7. Although the buckle 10 connected to the distal end of first non-filamented member 2 and the spaced-apart holes 13 through second non-filamented member are the preferred fastening means for joining the distal ends of the non-filamented members 2 and 3 together around the neck of a pet, it is also contemplated for preferred embodiment 1 to have other configurations of buckling attachment, as long as the other configurations selected for use are aesthetically pleasing. Further, although not limited thereto, it is contemplated for beads/objects 6 to include assorted sizes and shapes of glass, plastic, ceramic, metal, crystal, pearls, antique beads, vintage beads, decorated beads, painted beads, inlaid beads, polished wooden beads, cloisonne, precious stones, semi-precious stones, rhinestones, and other jewelry-like objects configured for support upon filament 7. Also, as shown in FIGS. 1a, 1b, and 1c, objects/beads 6 can have configurations that include but are not limited to round, diamond shaped, oval, elliptical, cubical, a parallelogram, dimpled, faceted, inlaid, flattened, and substantially conical, as well as those with a surface decoration as shown by the oblique parallel lines shown on either side of the enlarged central bead/object 6 that is designated by the letters "CL" to represent central positioning in FIGS. 2a–2c and 3a–3c. Beads/objects 6 may also be transparent to reveal filament 7, such as the two somewhat rectangular shaped beads/objects on either side of the central bead/object 6 marked with the letters "CL" and separated therefrom by three other beads/objects 6. In addition, by way of further example although not limited thereto, the enlarged circular bead/ object 6 providing a transition into looped configuration 4, could be made from plastic, metal, or ceramic, with an inlaid gemstone. The next large faceted bead/object 6 spaced therefrom could optionally be made from clear or colored crystal or glass. Also, it is contemplated that the two small longitudinally positioned beads/objects 6 on either side of the substantially cubical transparent bead/object 6 and through which filament 7 is visible in FIGS. 1b and 1c, could optionally be made from metal, ceramic material, or plastic.

Figure 2B:
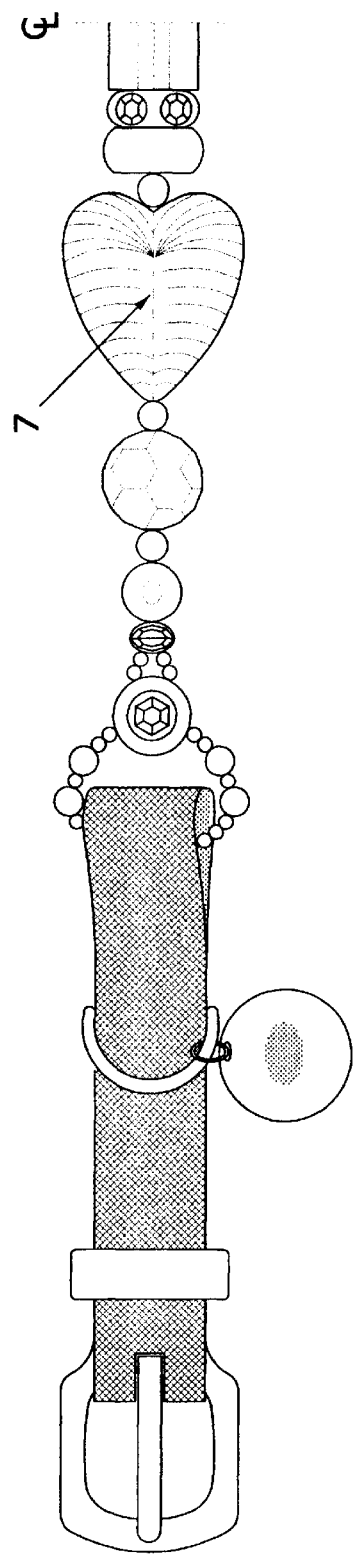
Figure 2C:
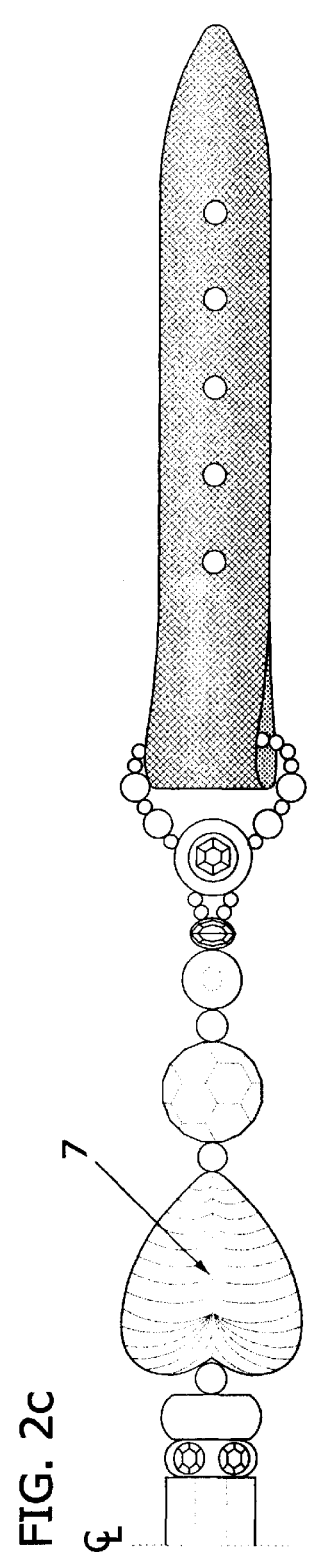
Figures 3A, 3B, 3C:
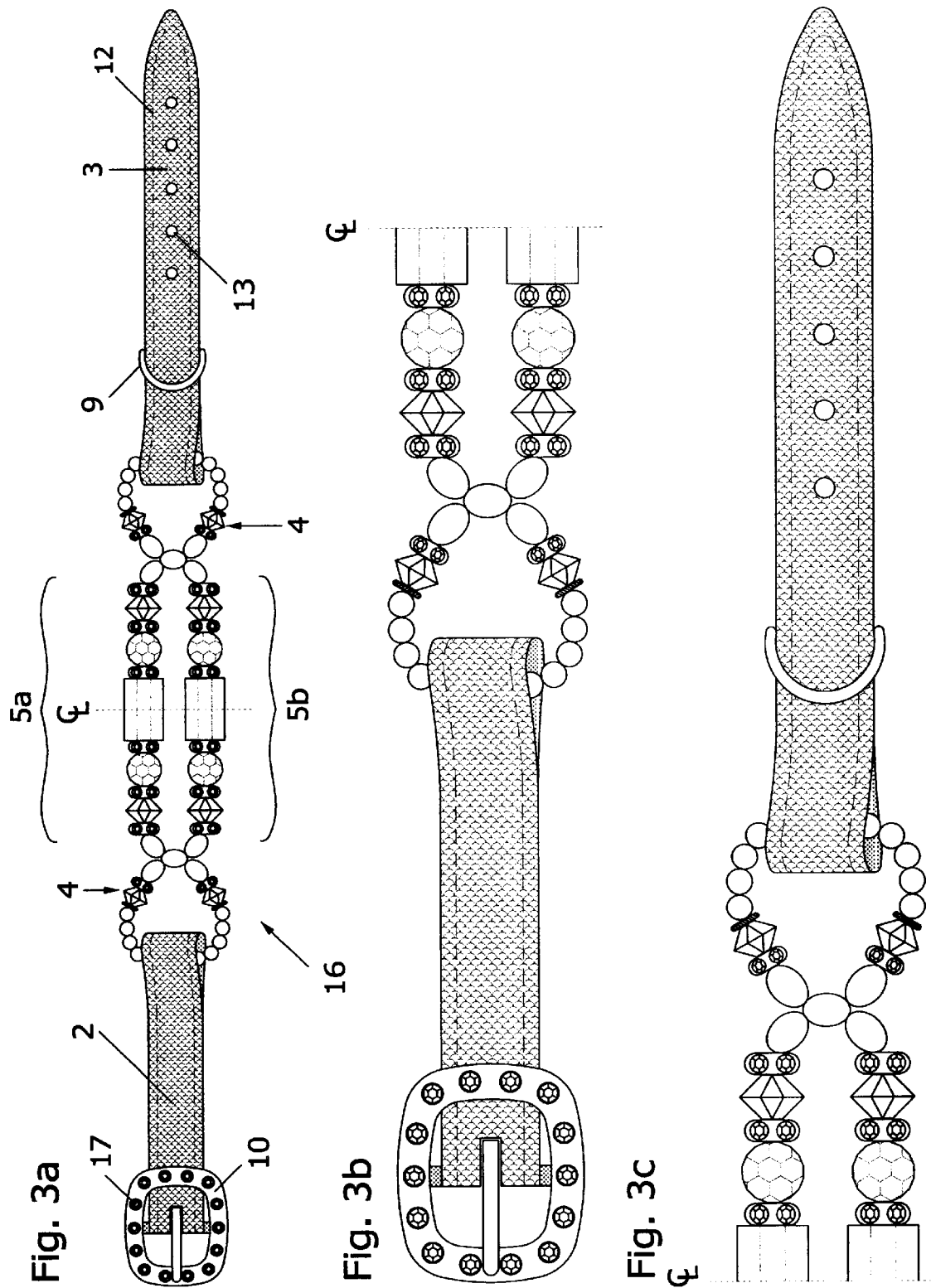

FIGS. 2a, 2b, and 2c show a second preferred embodiment of the present invention having a central filamented portion 5, a first non-filamented member 2 connected to one end of filamented portion 5, and a second non-filamented member 3 connected to the other end of filamented portion 5. Although not numerically marked in FIG. 2a, first non-filamented member 2 has a buckle 10 on its distal end and the distal end of second non-filamented member 3 has a tapering configuration with several holes 13 therethrough that are dimensioned for ready engagement with the tongue of buckle 10. The number of holes 13 used is not critical and can be more or less than the number shown. Also, the tapering configuration of the distal end of second non-filamented member 3 is preferred but not critical. FIGS. 2a–2c further show no longitudinal stitching 12 adjacent to the perimeter edges of first non-filamented member 2 and second non-filamented member 3, suggesting that a bonding agent or adhesive is used to form the proximal ends each thereof into a looped configuration. In addition, narrow sleeve 11 is also shown in FIGS. 2a and 2b without numerical marking in a position on first non-filamented member 2 that is near to buckle 10, and attachment ring 9 is also shown supported by first non-filamented member 2 and having an information badge/tag 15 suspended therefrom by a small unnumbered oval connector. Sleeve 11 and attachment ring 9 are preferably in fixed positions relative to first non-filamented member 2 and can be secured to first non-filamented member 2 any conventional means, such as but not limited to rivets, bonding agents, and/or adhesive. Although not shown, attachment ring 9 would also be used for temporary connection of a tether or clip at the end of a leash when needed for control of the animal wearing the present invention collar. Neither the configuration, nor the size, of the attachment ring 9 and sleeve 11 shown in FIGS. 2a and 2b is critical, however, each should be aesthetically pleasing so as not to detract from the overall stylishness and jewelry quality appearance of the present invention collar. The size, thickness, and selection of materials used for first non-filamented member 2 and second non-filamented member 3 would be similar to that in first preferred embodiment 1. The filamented portion 5 shown in FIGS. 2a–2c has a different sequence of beads/objects 6 than is shown in FIGS. 1a–1c. Although there is symmetry in the sequence of beads/objects 6 on both sides of the cylindrical center bead/object 6 marked by the letters "CL" in FIG. 2a, such symmetry is not required. The filamented portion 5 shown in FIGS. 2a–2c also has a connection loop 4 on each of its ends with beads/objects 6 similar to that shown in FIGS. 1a–1c, with the exception that crimping beads 8 are not shown to be part of connection loop 4, but instead are featured as a portion of the main sequence of breads/objects 6. When multiple crimping beads 8 are used as a part of the artistic design within the main sequence of beads/objects 6 in filamented portion 5, to reduce the risk of loss for beads/objects 6, no more than one or two beads/objects 6 would be lost in the event of filament 7 breakage or unfastening. For most purposes, although not limited thereto, a non-corroding metal wire would be used for filament 7, similar in composition to that used in jewelry quality beadwork but more substantial in diameter. Although not shown, other configurations of aesthetically pleasing buckling attachment are also contemplated in place of that shown in FIGS. 2a–2c. A selection of objects/beads 6 that is different from those shown in FIGS. 1a–1c is included as a part of the preferred embodiment shown in FIGS. 2a–2c. Two large heart-shaped beads are used, as well as a centrally located cylindrical bead/object 6. The order of sequencing for beads/objects 6 is not critical, with such sequencing being selected according to the style and preference of pet owners and handlers who value and honor their pets. Adjacent beads/objects 6 can be color coordinated or color contrasted for varying aesthetic effect. The large heart-shaped beads/objects 6 in FIGS. 2a–2c are shown to be transparent, with filament 7 revealed centrally therethrough. Although FIGS. 2a–2c and FIGS. 1a–1c show the same enlarged circular bead/object 6 providing a transition into connection loops 4, any other configuration of bead/object 6 having multiple openings therein could be alternatively used according to artistic preference. Further, although the beads/objects 6 forming the connection loops 4 in FIGS. 2a–2c are all round, it is also contemplated that beads/objects 6 with other shapes could be also used with or in place of the round beads/objects 6 shown. Also, although FIGS. 2a–2c show two different sizes of beads/objects 6 forming the connection loops 4, size is not a limitation, except that the beads/objects 6 positioned within the looped end configurations of non-filamented end members 2 and 3 would typically be small in size to reduce the amount of abrasion thereto during use.

FIGS. 3a, 3b, and 3c show a third preferred embodiment 16 of the present invention having two substantially parallel filamented portions 5a and 5b positioned between two connection loops 4, Although filamented portions 5a and 5b are shown to be identical in composition and symmetry, neither is critical and each could have a separate but complementary sequence of beads/objects 6 with or without end-to-end symmetry. Further, where appropriate to the size of animal to which the present invention collar is attached, additional filamented portions 5 could be used to make four, five, or even more substantially parallel filamented portions 5, with additional branching on one or more of the additional filamented portions 5 being possible, similar to the branching shown in FIGS. 1a and 2a immediately proximal to connection loops 4. Further, branching is not limited to being within a filamented portion 5, and could also extend between any of the adjacent and other filamented portions 5, including filamented portions 5a and 5b. One of the connection loops 4 in FIGS. 3a–3c is secured within the looped end configuration of first non-filamented end member 2, while the other connection loop 4 is secured within the looped end configuration of second non-filamented end member 3. FIGS. 3a–3c further show stitching 12 on non-filamented end members 2 and 3, attachment ring 9 on non-filamented end member 3 instead of non-filamented end member 2, no narrow sleeve 11, and a buckle 10 decorated with adorning objects 17, such as rhinestones or gems. Although not shown in FIGS. 3a–3c, at least one crimping bead 8 would be used on each end of filamented portions 5a and 5b to secure them and prevent highly valued beads/objects 6 from becoming lost and/or eaten by the animal (not shown) wearing the present invention collar should filament 7 ever break. For the embodiment shown in FIGS. 3a–3c, the crimping beads 8 could be hidden within the looped end configuration of the non-filamented end members 2 and 3 and represented by one of the round beads/objects 6 hidden within the looped end configuration of the non-filamented end members 2 and 3, or in the alternative, multiple crimping beads 8 could be represented by the sixteen elongated elliptical beads/objects 6 each having two laterally positioned decorative objects or decorations on its top surface. The overall length dimension of filamented portions 5a and 5b, in combination with connection loops 4, as shown in FIG. 3a, appears to be shorter than the filamented portions 5 shown in FIGS. 2a and 1a. Also, the beads/objects 6 in FIG. 2a appear to be larger than those shown in FIG. 1a. Therefore, perhaps the embodiments illustrated in FIGS. 2a–2c having the larger beads/objects 6 would be better used on a larger domestic animal or one with thicker fur (not shown), while the first preferred embodiment 1 shown in FIG. 1a with its smaller beads/objects 6 and the embodiment shown in FIG. 3a with its shorter filament portion 5a and 5b lengths would be better used on a smaller animal or one with less thick fur.

To make the present invention, the overall length of the collar and the material to be used for filament 7 would be selected according to the weight of the animal intended to wear it. Once those determinations are made, a length of filament 7 is chosen to provide sufficient surplus for ease in handling during collar assembly and making appropriate looped connections to secure the opposing ends of filament 7 to non-filamented end members 2 and 3. It is preferred that wire be used for filament 7 for its strength, such as but not limited to stainless steel wire. The assortment of beads/objects 6 intended for use on filament 7 is then selected and arranged for convenient manipulation in placement upon filament 7. One end of filament 7 is then inserted centrally through each of the selected beads/objects 6, whereby they become supported in a closely aligned configuration upon filament 7. Subsequently, a first end of filament 7 is inserted through one of the looped ends of either first non-filamented end member 2 or second non-filamented end member 3, with care being taken to maintain all of the selected beads/objects 6 upon the non-inserted portion of filament 7. A bead crimper device (not shown but typically of the type used generally in beadwork) is then used to apply one crimping bead 8 to the inserted end of filament 7 to secure it through the looped end of the first selected end member 2 or 3. The same process is repeated for the second end of filament 7 in attaching it to the looped end of the remaining non-filamented end member 2 or 3. Optionally, manufacture can also include the use of crimping beads 8 at spaced-apart intervals on the center portions of filament 7 between beads/objects 6, such as but not limited to intervals of one inch, to eliminate the risk of breakage or loss to a large number of beads/objects 6 should filament 7 unexpectedly break or become unfastened. For use with most cats and smaller breads of dogs, once filament 7, first non-filamented portion 2, and second non-filamented portion 3 are joined, the resulting total length, although not limited thereto, is typically twelve to fourteen inches. Crimping beads 8 are permanently positioned upon filament 7, and once a crimping bead 8 is used it cannot be used again. However, a crimping bead 8 can be cut from a filament 7, with the resulting lengths of filament 7 used in a collar if sufficient in length to work with, otherwise a replacement filament 7 is required for securing the remaining beads/objects 6 on the cut filament 7, as a part of a present invention collar.

Although not limited thereto, the preferred materials for non-filament end members 2 and 3 are leather, fabric, other woven materials, plastics, and metals. When leather, fabric, other woven materials, and plastics are used, it is preferred that the loop ends are formed by use of stitching and/or adhesive. Conversely, when non-filament end members 2 and 3 are made from metal and contain links or a mesh configuration, no stitching or adhesive would be required. Instead, one or more filaments 7 could be attached directly through the end link or directly into the end of the mesh. The buckles 17 used with the present may vary in size and shape, and may be made from many different materials, such as but not limited to metal, plastic, wood, shell, bone, ivory, and ceramic material. They can also be painted, have inlaid designs, display inset gems or rhinestones, and/or be decorated in other ways that complement and/or enhance the materials used for non-filamented end members 2 and 3 or the beads/objects 6 supported by filament 7. Although a single strand of a medium gauge wire is preferably used for filament 7 in most preferred embodiments of the present invention, other materials are also considered within the scope of the present invention, including but not limited to coated wires and multiple strands of the same or different wire or other material.

I claim:

1. A sturdy animal collar for adjustable fastening around the neck of a pet to provide a means for animal control and stylish animal adornment individualized to the preference of its owner/handler, said collar comprising:

a center filamented portion having at least one aligned sequence of adorning objects supported upon a sturdy filament with opposing ends;

a pair of non-filamented end members each having a proximal and a distal end, said proximal ends each having a looped configuration;

detachable and adjustable engagement means adapted for securing to one another said distal ends of said non-filamented end members, and fastening means adapted for securely fixing each of said opposing ends of said at least one center filamented portion into a connection loop that is intertwined with said proximal end looped configuration of one of said non-filamented end members so that said at least one center filamented portion is incorporated as a functioning part of said collar during pet ambulation and other situations where stress is placed upon said collar by the pet wearing it with reduced risk of loss to said adorning items during use.

2. The collar of claim 1 further comprising attachment means adapted for securing a plurality of clips and connectors to at least one of said non-filamented end members, with each said clip and connector employed being configured for connection of tethers used for animal obedience and control, as well as for connection of lightweight objects displaying identifying information about the animal wearing said collar.

3. The collar of claim 2 wherein said attachment means comprises at least one D-shaped ring.

4. The collar of claim 1 wherein said fastening means is decorative and incorporated into said center filamented portion as a part of said aligned sequence of adorning objects.

5. The collar of claim 1 wherein said fastening means is decorative and incorporated into said connection loop.

6. The collar of claim 5 wherein said fastening means is also incorporated into said center filamented portion as a part of said aligned sequence of adorning objects as a means for reducing the risk losing said adorning objects should said filamented portion break or become unfastened.

7. The collar of claim 1 wherein said fastening means comprises at least two crimping beads.

8. The collar of claim 1 wherein said end members are selected from a group consisting of end members made from leather, suede, fabric, woven materials, metal, and plastic.

9. The collar of claim 1 wherein said adorning objects are selected from a group consisting of glass objects, plastic objects, metal objects, ceramic objects, crystalline objects, crystals, pearls, antique beads, vintage beads, decorated beads, painted beads, inlaid beads, polished wooden beads, cloisonné, precious stones, semi-precious stones, rhinestones, round objects, diamond-shaped objects, oval objects, elliptical objects, cubical objects, rectangular objects, parallelogram objects, dimpled objects, faceted objects, inlaid objects, flattened objects, and substantially conical objects, heart-shaped objects, cylindrical objects, colored objects, transparent objects, translucent objects, and opaque objects.

10. The collar of claim 1 wherein said detachable and adjustable engagement means comprises a buckled fastener.

11. The collar of claim 1 wherein said buckled fastener comprises surface decoration.

12. A sturdy animal collar for adjustable fastening around the neck of a pet to provide a means for animal control, attachment of tags and badges containing personalized information about the pet, and jewelry-like animal adornment, said collar comprising:

a center filamented portion having at least one aligned sequence of adorning objects supported upon a sturdy filament with opposing ends, each said adorning objects being selected from a group consisting of glass objects, plastic objects, metal objects, ceramic objects, crystalline objects, crystals, pearls, antique beads, vintage beads, decorated beads, painted beads, inlaid beads, polished wooden beads, cloisonné, precious stones, semi-precious stones, rhinestones, round objects, diamond-shaped objects, oval objects, elliptical objects, cubical objects, rectangular objects, parallelogram objects, dimpled objects, faceted objects, inlaid objects, flattened objects, and substantially conical objects, heart-shaped objects, cylindrical objects, colored objects, transparent objects, translucent objects, and opaque objects;

a pair of non-filamented end members each having a proximal and a distal end, said proximal ends each having a looped configuration;

detachable and adjustable engagement means adapted for securing to one another said distal ends of said non-filamented end members, attachment means adapted for securing a plurality of clips and connectors to at least one of said non-filamented end members, with each said clip and connector being configured for temporary connection of tethers used for animal control and lightweight objects displaying identifying information about the animal wearing said collar; and fastening means adapted for securely fixing each of said opposing ends of said center filamented portion into a connection loop that is interwined with said proximal end looped configuration of one of said non-filamented end members so that said center filamented portion is incorporated as a functioning part of said collar during pet ambulation and other situations where stress is placed upon said collar by the pet wearing it with reduced risk of loss to said adorning items during use.

13. The collar of claim 12 wherein said fastening means is decorative and incorporated into said center filamented portion as a part of said aligned sequence of adorning objects.

14. The collar of claim 12 wherein said fastening means is decorative and incorporated into said connection loop.

15. The collar of claim 14 wherein said fastening means is also incorporated into said center filamented portion as a part of said aligned sequence of adorning objects.

16. The collar of claim 12 wherein said fastening means comprises at least two crimping beads.

17. The collar of claim 1 wherein said detachable and adjustable engagement means comprises a buckled fastener.

18. The collar of claim 1 wherein said buckled fastener comprises surface decoration.

* * * * *